G. & J. FAWKES.
HULL OF NAVIGABLE VESSELS.
APPLICATION FILED APR. 3, 1911.
1,009,230.
Patented Nov. 21, 1911.
2 SHEETS—SHEET 1.
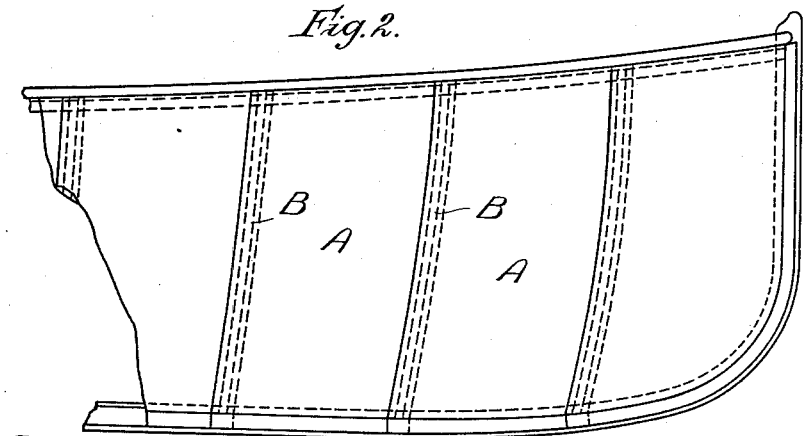
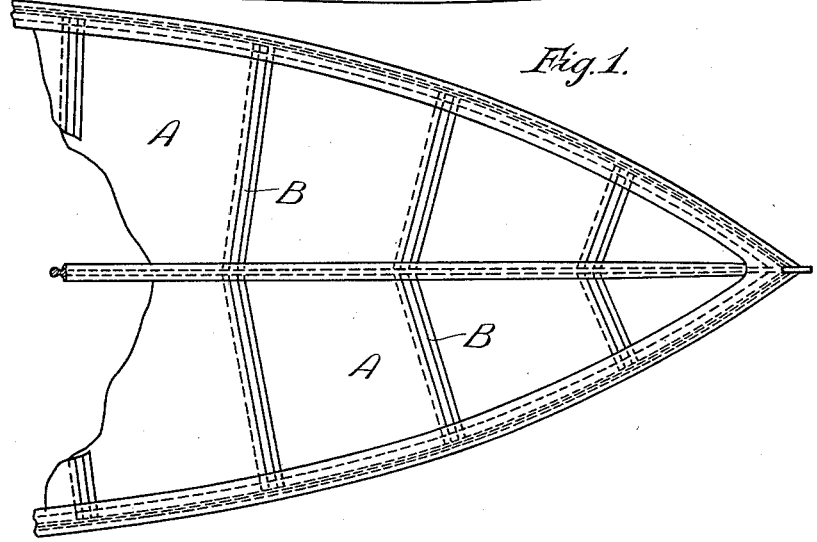
WITNESSES:
INVENTORS,
GEORGE FAWKES
and JOHN FAWKES
by
Attorney.

G. & J. FAWKES.
HULL OF NAVIGABLE VESSELS.
APPLICATION FILED APR. 3, 1911.
1,009,230.
Patented Nov. 21, 1911.
2 SHEETS—SHEET 2.
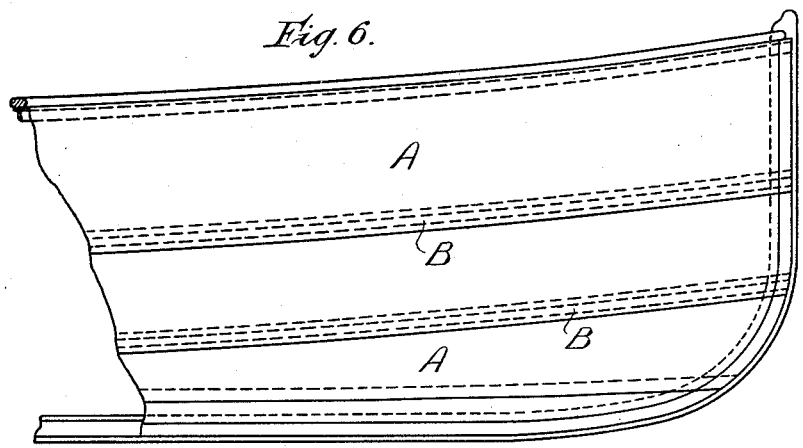
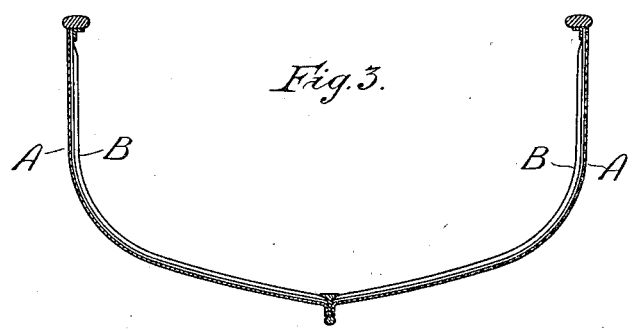
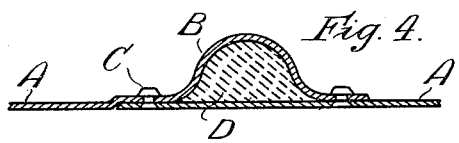
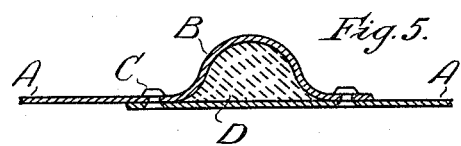
WITNESSES;
W. H. Berrigan
John N. Hoving
INVENTORS,
GEORGE FAWKES
and JOHN FAWKES
by J. Van Derveer
Attorney.
COLUMBIA PLANOGRAPH CO., WASHINGTON, D. C.

UNITED STATES PATENT OFFICE.

GEORGE FAWKES AND JOHN FAWKES, OF GLASGOW, SCOTLAND.

HULL OF NAVIGABLE VESSELS.

1,009,230.        Specification of Letters Patent.     Patented Nov. 21, 1911.

Application filed April 3, 1911. Serial No. 618,698.

*To all whom it may concern:*

Be it known that we, GEORGE FAWKES and JOHN FAWKES, subjects of the King of the United Kingdom of Great Britain and Ireland, and residing at Scotstoun Ironworks, Glasgow, Scotland, have invented a certain new and useful Improvement in Hulls of Navigable Vessels, of which the following is a specification.

This invention relates to navigable vessels such as power-driven, sailing and rowing craft, whether provided with athwartship, diagonal or fore and aft plating, and it has for its object to provide for strengthening the hulls of such vessels without materially increasing their weight. To this end, the steel or other metal plates of which the hull is built are creased or embossed so as to form in the completed structure an embossed framing or rib at or near the overlapping junction lines where the plates are connected together.

In the accompanying drawings Figure 1 is a part plan of a steel boat illustrating the invention by way of example, the embossed frames being shown square to the outside form of the boat at the joints of the athwartship shell plating. Fig. 2 is an outside elevation of the fore part of the boat with embossed frames. Fig. 3 is a cross section through the boat showing the method of closing down the embossed frames at the ends so as to prevent water or moisture finding its way inside of the frames. Figs. 4 and 5 are alternative cross sections on an enlarged scale through one of the embossed frames. Fig. 6 is a like view to Fig. 2 but shows the plating extending fore and aft.

Referring to the drawings, each of the plates A of which the hull is composed is creased or embossed to form a rib or stiffener B in proximity to one edge, and the plates are overlapped, and connected together on opposite sides of the rib, as by means of rivets C, Figs. 4 and 5.

For light craft, it is preferred to joggle each of the plates A at one end (see Fig. 4) so that the continuity of the lines of the hull is not interfered with by the strengthening ribs B which extend athwartships inside the hull, as shown in Figs. 1, 2 and 3. The ribs B may however be so creased or embossed as to extend fore and aft, as shown in Fig. 6. The spaces between the ribs and the plates are preferably filled with plastic cement, as indicated at D, Figs. 4 and 5.

Having now described our invention what we claim and desire to secure by Letters Patent of the United States is:—

1. A hull comprising plates connected together at their adjoining ends, each plate creased near one end only, the creased end overlapping the uncreased end of the adjoining plate and adapted for attachment to the adjoining plate on each side of the crease.

2. A hull comprising plates connected together at their adjoining ends, each plate creased and joggled at one end only, the creased and joggled end overlapping the uncreased end of the adjoining plate.

In testimony whereof we have signed our names to this specification in the presence of two subscribing witnesses.

GEORGE FAWKES.
                     JOHN FAWKES.

Witnesses:
    JOHN MCCLEARY,
    THOMAS BISHOP GRAHAM.

---

Copies of this patent may be obtained for five cents each, by addressing the "Commissioner of Patents, Washington, D. C."